United States Patent
Wu

(10) Patent No.: US 10,321,374 B2
(45) Date of Patent: Jun. 11, 2019

(54) DEVICE AND METHOD FOR HANDLING USER EQUIPMENT CONFIGURATION

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/908,836

(22) Filed: Mar. 1, 2018

(65) Prior Publication Data

US 2018/0255493 A1    Sep. 6, 2018

Related U.S. Application Data

(60) Provisional application No. 62/465,735, filed on Mar. 1, 2017.

(51) Int. Cl.
*H04W 36/08* (2009.01)
*H04W 8/22* (2009.01)
*H04W 4/50* (2018.01)

(52) U.S. Cl.
CPC .............. *H04W 36/08* (2013.01); *H04W 4/50* (2018.02); *H04W 8/22* (2013.01)

(58) Field of Classification Search
CPC .......... H04W 36/08; H04W 4/50; H04W 8/22
See application file for complete search history.

(56) References Cited

U.S. PATENT DOCUMENTS

| 2009/0247150 | A1* | 10/2009 | Fischer | H04W 24/10 455/425 |
| 2010/0323753 | A1 | 12/2010 | Imamura | |
| 2013/0121308 | A1* | 5/2013 | Dhingra | H04W 36/0072 370/331 |
| 2016/0219475 | A1* | 7/2016 | Kim | H04L 5/00 |
| 2016/0316408 | A1* | 10/2016 | Nagasaka | H04W 48/18 |
| 2017/0019820 | A1* | 1/2017 | Das | H04W 36/0016 |

FOREIGN PATENT DOCUMENTS

| EP | 2 919 519 A1 | 9/2015 |
| WO | 2008/157717 A1 | 12/2008 |
| WO | 2010/086498 A1 | 8/2010 |

OTHER PUBLICATIONS

Search Report dated Aug. 16, 2018 for EP application No. 18159555.4, pp. 1-6.

(Continued)

*Primary Examiner* — Duc C Ho
(74) *Attorney, Agent, or Firm* — Winston Hsu

(57) ABSTRACT

A communication device for handling a temporary UE configuration comprises a storage device for storing instructions and a processing circuit coupled to the storage device. The processing circuit is configured to execute the instructions stored in the storage device. The instructions comprise receiving a configuration from a first base station; communicating with the first BS according to the configuration; transmitting a first message to the first BS to request changing the configuration; performing a handover to a second BS; and transmitting the first message to the second BS to request changing the configuration, when connecting to the second BS in response to the handover.

11 Claims, 4 Drawing Sheets

(56) References Cited

OTHER PUBLICATIONS

Ericsson, "Proposed procedure to handle Uplink Multislot Output Power", 3GPP TSG GERAN #15, Tdoc GP-031544, Jun. 23-27, 2003, Fort Lauderdale, FL USA, XP050008794, pp. 1-4.
Huawei, HiSilicon, MediaTek Inc., "Thermal issues with high capability UEs", 3GPP TSG-RAN WG2 #97, R2-1701835, Feb. 13-17, 2017, Athens, Greece, XP051212399, pp. 1-5.
Search Report dated May 7, 2018 for EP application No. 18159555.4, pp. 1-22.
3GPP TSG-RAN WG2 Meeting #100, R2-1714010, Reno, Nevada, USA, Nov. 27-Dec. 1, 2017.
Office action dated Nov. 14, 2018 for the Taiwan application No. 107106839, filing date Mar. 1, 2018, pp. 1-9.

* cited by examiner

DEVICE AND METHOD FOR HANDLING USER EQUIPMENT CONFIGURATION

CROSS REFERENCE TO RELATED APPLICATIONS

This application claims the benefit of U.S. Provisional Applications No. 62/465,735 filed on Mar. 1, 2017, which is incorporated herein by reference.

BACKGROUND OF THE INVENTION

1. Field of the Invention

The present invention relates to a device and a method used in a wireless communication system, and more particularly, to a device and a method of handling a temporary user equipment (UE) configuration in a wireless communication system.

2. Description of the Prior Art

When a UE connects to a first base station (BS), the first BS may request the UE to transmit a UE capability. The first BS may transmit the UE capability to a core network (CN) and may configure the UE according to the UE capability. However, the UE may not be capable of the UE capability (e.g., due to an internal problem), and time-frequency resource for communication operations is wasted.

SUMMARY OF THE INVENTION

The present invention therefore provides a communication device for handling a temporary UE configuration to solve the abovementioned problem.

A communication device for handling a temporary UE configuration comprises a storage device for storing instructions and a processing circuit coupled to the storage device. The processing circuit is configured to execute the instructions stored in the storage device. The instructions comprise receiving a configuration from a first base station; communicating with the first BS according to the configuration; transmitting a first message to the first BS to request changing the configuration; performing a handover to a second BS; and transmitting the first message to the second BS to request changing the configuration, when connecting to the second BS in response to the handover.

A first BS for handling a temporary UE configuration comprises at least one storage device for storing instructions and at least one processing circuit coupled to the at least one storage device. The at least one processing circuit is configured to execute the instructions stored in the at least one storage device. The instructions comprise transmitting a configuration to a communication device; communicating with the communication device according to the configuration; receiving a first message requesting changing the configuration, from the communication device; transmitting a Handover Request message to initiate a handover to a second BS, wherein the Handover Request message comprises information indicating that the communication device requests changing the configuration to the second BS when initiating the handover; receiving a Handover Request Acknowledge message for responding to the Handover Request message from the second BS, wherein the Handover Request Acknowledge message comprises a handover command; and transmitting the handover command to the communication device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
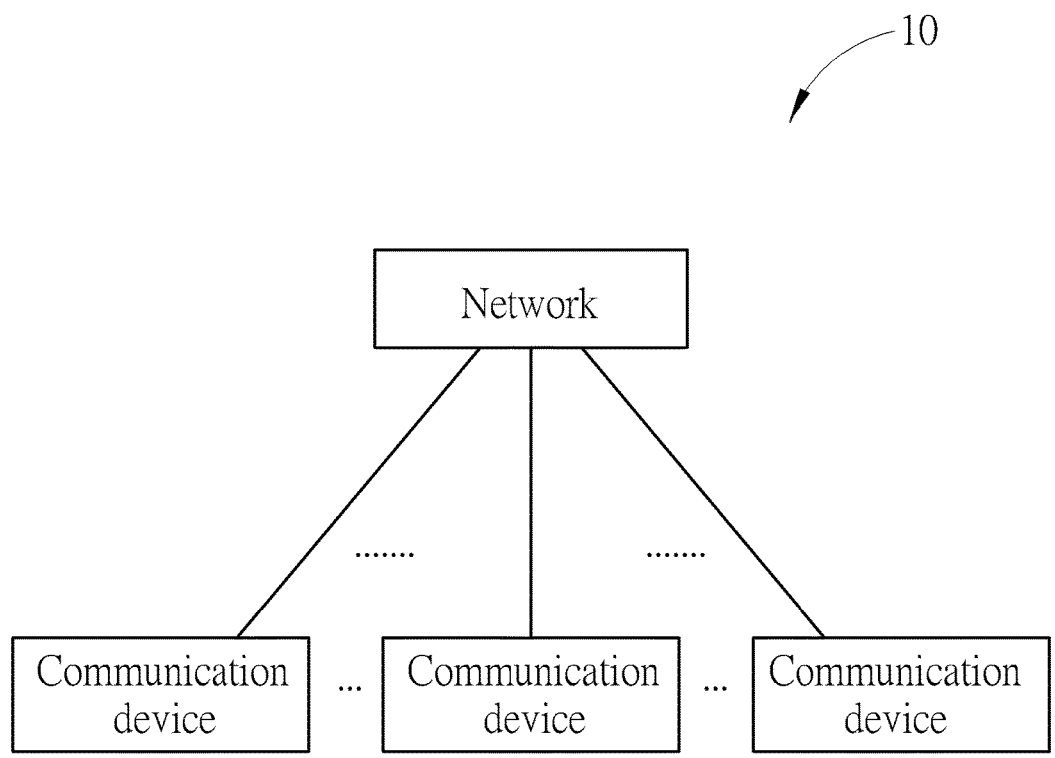
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s). The network and the communication device may communicate with each other via one or multiple cells (e.g., multiple carriers) belonging to one or multiple base stations (BSs).

In FIG. 1, the network and the communication devices are simply utilized for illustrating the structure of the wireless communication system 10. Practically, the network may comprise at least one of a long-term evolution (LTE) network and a new radio (NR) network. The LTE network may comprise at least one of an evolved universal terrestrial radio access network (E-UTRAN) including at least one evolved Node-B (eNB) and an Evolved Packet Core (EPC). The NR network may comprise a fifth generation (5G) radio access network including at least one 5G BS (called gNB or an evolved eNB (eLTE eNB)) and a Next Generation Core (NGC).

A communication device may be a user equipment (UE), a machine type communication (MTC) device, a mobile phone, a laptop, a tablet computer, an electronic book, a portable computer system, a vehicle, or an aircraft. In addition, the network and the communication device can be seen as a transmitter or a receiver according to direction of transmission (i.e., transmission direction), e.g., for an uplink (UL), the communication device is the transmitter and the network is the receiver, and for a downlink (DL), the network is the transmitter and the communication device is the receiver.

Figure 2:
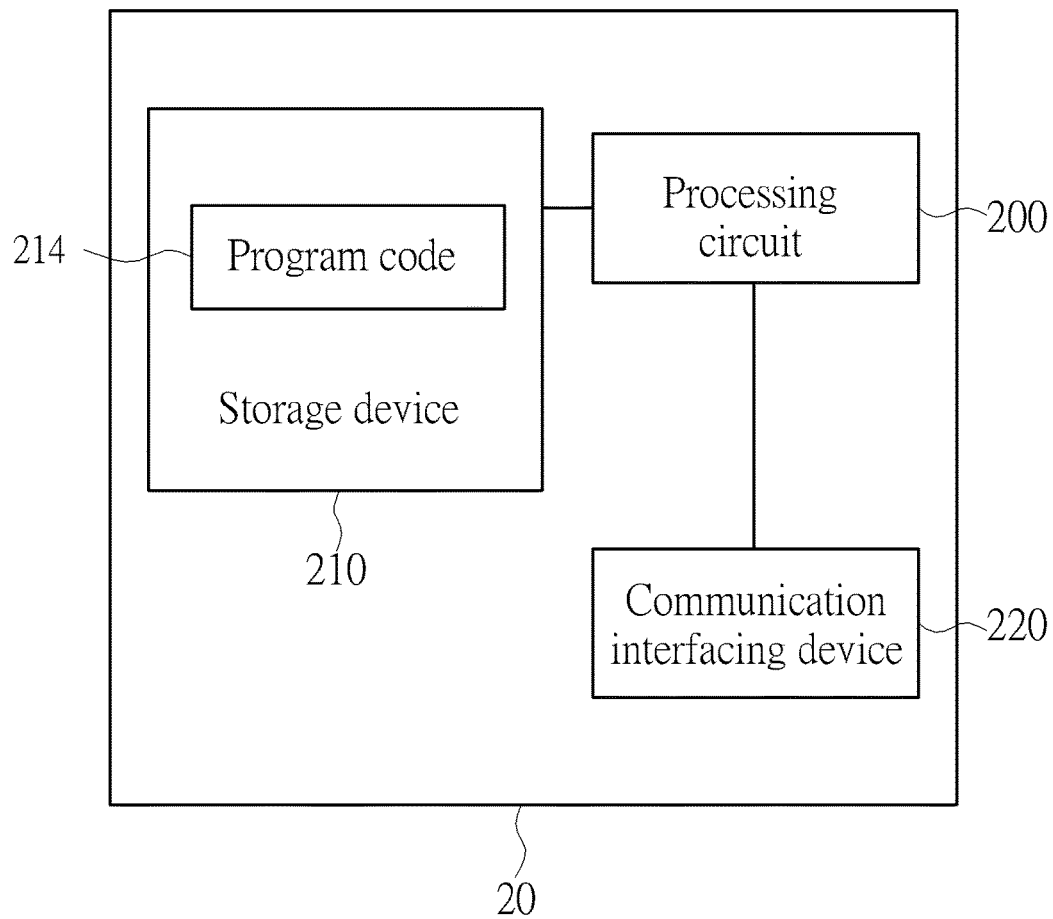
FIG. 2 is a schematic diagram of a communication device according to an example of the present invention.

FIG. 2 is a schematic diagram of a communication device 20 according to an example of the present invention. The communication device 20 may be a communication device or the network (e.g., a BS or a network node) shown in FIG. 1, but is not limited herein. The communication device 20 may include at least one processing circuit 200 such as microprocessor(s) or Application Specific Integrated Circuit(s) (ASIC(s)), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 may comprise at least one transceiver used to transmit and receive signals (e.g., data, messages and/or packets) according to processing results of the at least one processing circuit 200.

In the following embodiments, a UE is used for representing a communication device in FIG. 1, to simplify the illustration of the embodiments.

Figure 3:
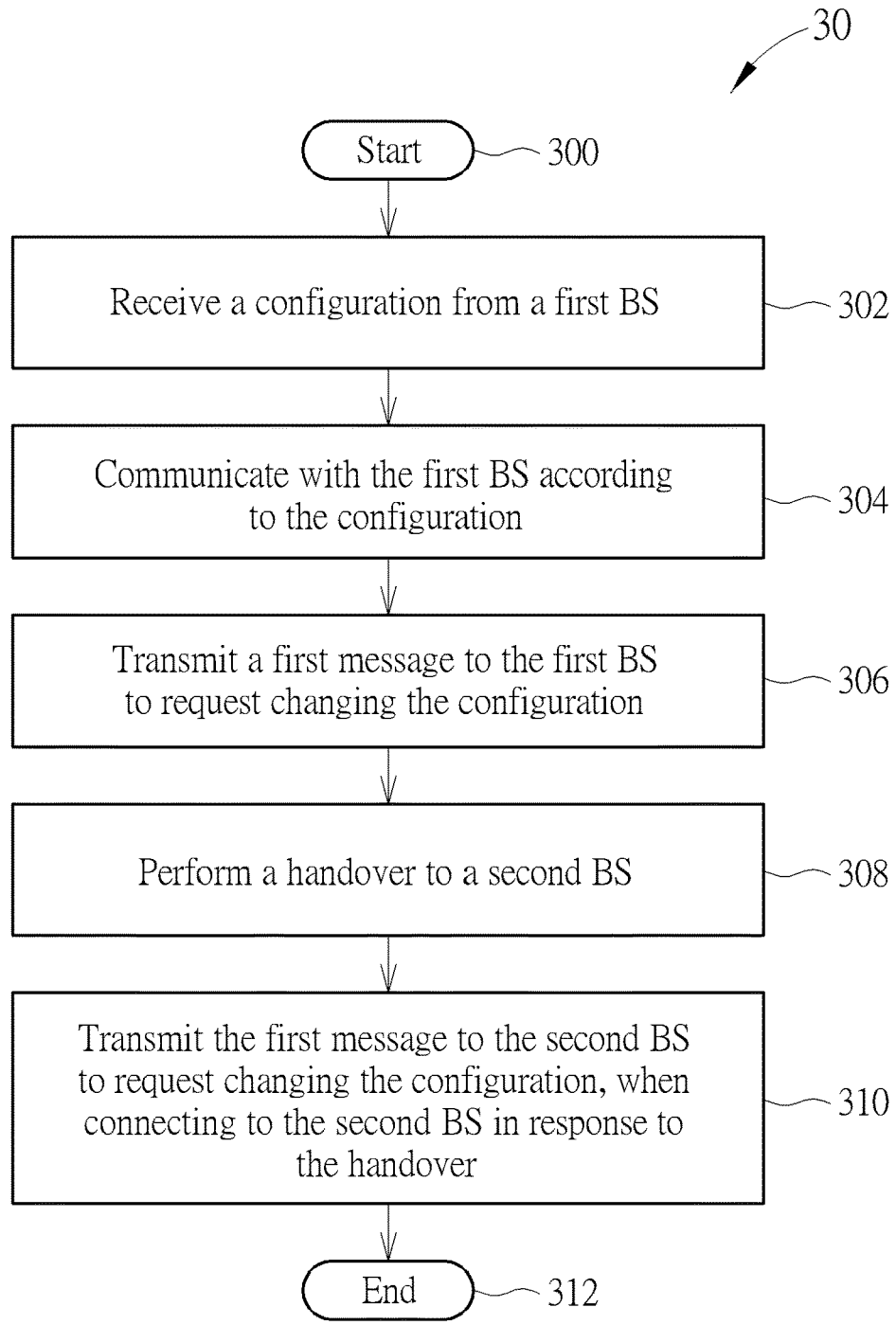
FIG. 3 is a flowchart of a process according to an example of the present invention.

A process 30 in FIG. 3 can be utilized in a UE, and includes the following steps:

Step 300: Start.
Step 302: Receive a configuration from a first BS.
Step 304: Communicate with the first BS according to the configuration.
Step 306: Transmit a first message to the first BS to request changing the configuration.
Step 308: Perform a handover to a second BS.
Step 310: Transmit the first message to the second BS to request changing the configuration, when connecting to the second BS in response to the handover.
Step 312: End.

According to the process 30, the UE receives a configuration from a first BS. Then, the UE communicates with the first BS according to the configuration. The UE transmits a first message to the first BS to request changing the configuration. The UE performs a handover to a second BS. The UE transmits the first message to the second BS to request changing the configuration, when connecting to the second BS in response to the handover. That is, the UE transmits the first message again to the second BS after the handover, to request the second BS to change the configuration.

The following examples may be applied to the process 30.

In one example, the UE receives a handover command for the handover to the second BS, from the first BS. The UE may transmit a handover complete message responding to the handover command, to the second BS. When the handover command does not change the configuration, the UE determines to transmit the first message to the second BS. When the handover command changes the configuration, the UE determines not to transmit the first message to the second BS.

In one example, changing the configuration comprises releasing the configuration or modifying the configuration. In response to the first message, the first BS or the second BS transmits a second message which releases, deactivates or reconfigures the configuration, to the UE.

In one example, the UE determines to transmit the first message, when an event or a condition occurs in the UE. The event or the condition may be that an overheating problem occurs, a hardware component related to the configuration is temporarily not available, or a battery capacity is lower than a predetermined threshold.

In one example, the configuration is a carrier aggregation (CA) configuration configuring the number (e.g., 4) of carriers to be aggregated to a maximum number (e.g., 4) of carriers the UE is capable of as indicated in a UE capability. The first BS may receive the UE capability from the UE, a core network (CN) or from a third BS. The UE may receive a plurality of transmissions on the number of carriers from the first BS. After a while, the UE transmits the first message to request the first BS to remove the CA configuration (i.e., to stop configuring the CA to the UE), to modify the CA configuration to decrease the number of carriers to be aggregated, or to deactivate at least one of the number of carriers. After transmitting the first message, the UE receives the handover command requesting the UE to hand over to the second BS. The UE transmits the first message to the second BS, when the UE hands over to the second BS. In one example, the first message is a radio resource control (RRC) message which requests (or indicates) removing the CA configuration or decreasing the number of carriers to be aggregated. In one example, the first message is a medium access control (MAC) control element (CE) which requests deactivating the at least one of the number of carriers.

In one example, the configuration is a multi-input-multi-output (MIMO) configuration configuring the number of MIMO layers to a maximum number (e.g., 4) of MIMO layers the UE is capable of as indicated in a UE capacity. The first BS may receive the UE capability from the UE, a CN or from a third BS. The UE may receive a plurality of transmissions using the number of MIMO layers from the first BS. After a while, the UE transmits the first message to request the first BS to remove the MIMO configuration (i.e., to stop configuring the MIMO to the UE) or to modify the MIMO configuration to decrease the number of MIMO layers. After transmitting the first message, the UE receives the handover command requesting the UE to hand over to the second BS. The UE transmits the first message to the second BS when the UE hands over to the second BS according to the handover command. In one example, the first message is a RRC message or a MAC CE which requests removing the MIMO configuration or decreasing the number of MIMO layers.

In one example, the UE may or may not transmit the first message, when or after the UE successfully reestablishes a RRC connection to the first BS or the second BS due to a RRC connection reestablishment procedure.

Figure 4:
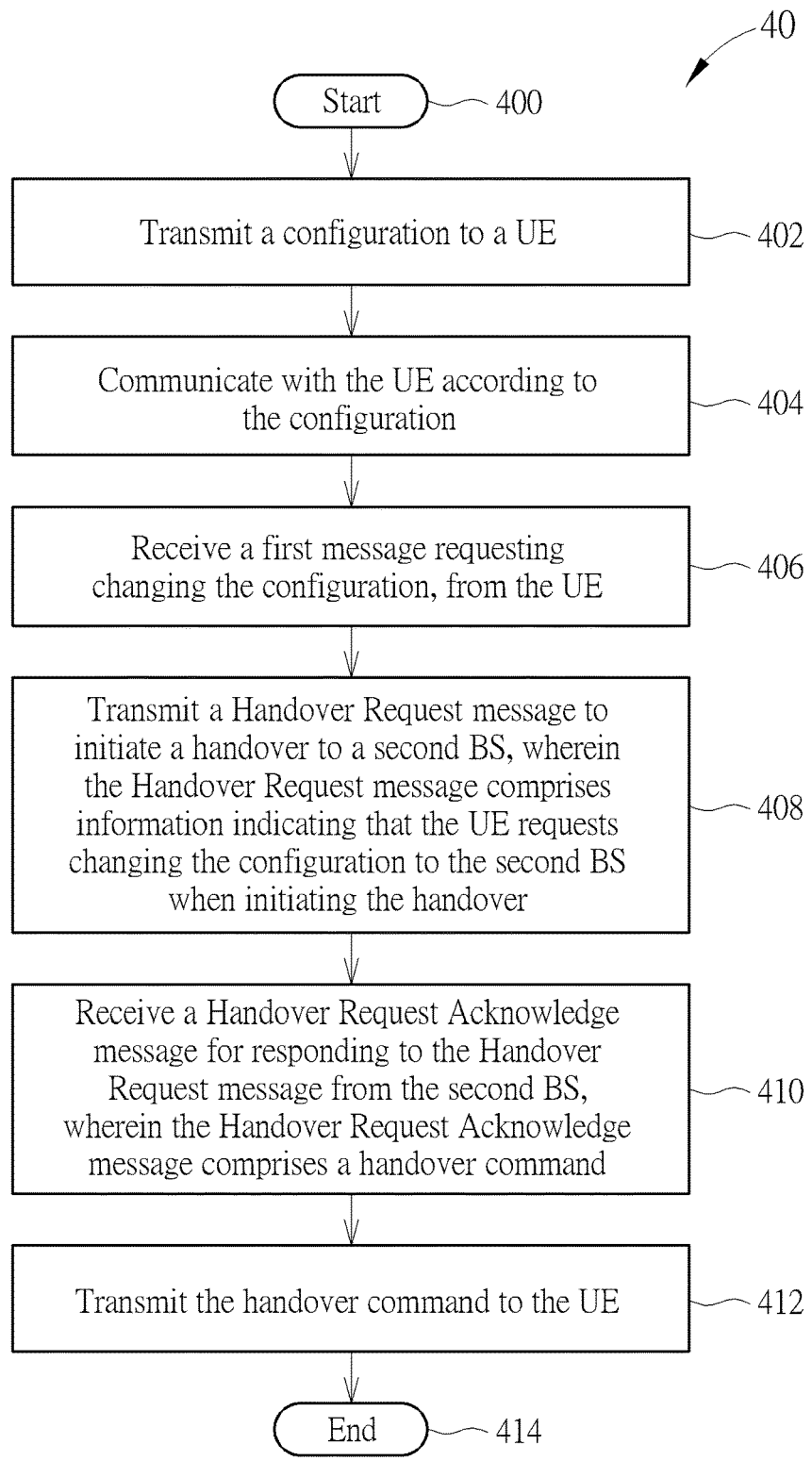
FIG. 4 is a flowchart of a process according to an example of the present invention.

A process 40 in FIG. 4 can be utilized in a first BS, and includes the following steps:

Step 400: Start.
Step 402: Transmit a configuration to a UE.
Step 404: Communicate with the UE according to the configuration.
Step 406: Receive a first message requesting changing the configuration, from the UE.
Step 408: Transmit a Handover Request message to initiate a handover to a second BS, wherein the Handover Request message comprises information indicating that the UE requests changing the configuration to the second BS when initiating the handover.
Step 410: Receive a Handover Request Acknowledge message for responding to the Handover Request message from the second BS, wherein the Handover Request Acknowledge message comprises a handover command.
Step 412: Transmit the handover command to the UE.
Step 414: End.

According to the process 40, the first BS transmits a configuration to a UE. Then, the first BS communicates with the UE according to the configuration. The first BS receives a first message requesting changing the configuration, from the UE. The first BS transmits a Handover Request message to initiate a handover to a second BS, wherein the Handover Request message comprises information indicating that the UE requests changing the configuration to the second BS when initiating the handover. The first BS receives a Handover Request Acknowledge message for responding to the Handover Request message from the second BS, wherein the Handover Request Acknowledge message comprises a handover command. The first BS transmits the handover command to the UE. That is, when the handover command modifies or releases the configuration as the UE expects, the UE does not transmit the first message to the second BS after the handover.

The following examples may be applied to the process 40.

In one example, the information is the first message.

In one example, in response to the information, the second BS releases or modifies the configuration in the handover command or in a second message by considering the information. That is, the handover command or the second message may configure the UE to release or modify the configuration. The second message is transmitted by the second BS to the UE, after the transmission of the handover command or receiving a handover complete message responding to the handover command from the UE.

In one example, the UE transmits a third message to the second BS to cancel the request for changing the configuration, if the event or the condition stated in process 30 is no longer held. The UE transmits the first message to the second BS, when the handover command does not modify or release the configuration as the UE expects.

The description for the process 30 can be applied to the process 40, and is not narrated herein.

The following example may be applied to the processes 30-40.

The handover command may be a RRC message (e.g. a RRC Connection Reconfiguration message or a RRC Reconfiguration message). The handover complete message may be a RRC response message (e.g. a RRC Connection Reconfiguration Complete message or a RRC Reconfiguration Complete message).

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program code 214.

To sum up, the present invention provides a method and a device for handling a temporary UE configuration. The first BS can temporarily downgrade a UE configuration according to the configuration. Thus, the problem in the art is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling user equipment (UE) configuration, comprising:
    a storage device; and
    a processing circuit, coupled to the storage device, wherein the storage device stores, and the processing circuit is configured to execute instructions of:
    receiving a configuration from a first base station (BS);
    communicating with the first BS according to the configuration;
    transmitting a first message to the first BS to request changing the configuration;
    performing a handover to a second BS; and
    transmitting the first message to the second BS to request changing the configuration, when connecting to the second BS in response to the handover.

2. The communication device of claim 1, wherein the instructions further comprise:
    receiving a handover command for the handover to the second BS, from the first BS;
    determining to transmit the first message to the second BS, when the handover command does not change the configuration; and
    determining not to transmit the first message to the second BS, when the handover command changes the configuration.

3. The communication device of claim 1, wherein the instructions further comprise:
    receiving a second message from the first BS or the second BS, when the first BS or the second BS receives the first message, wherein the second message releases, deactivates or reconfigures the configuration.

4. The communication device of claim 1, wherein the configuration is a carrier aggregation (CA) configuration.

5. The communication device of claim 1, wherein the configuration is a multi-input-multi-output (MIMO) configuration.

6. The communication device of claim 1, wherein the communication device transmits the first message, after the communication device successfully reestablishes a radio resource control (RRC) connection to the first BS or the second BS.

7. A first base station (BS) for handling user equipment (UE) configuration, comprising:
    at least one storage device; and
    at least one processing circuit, coupled to the at least one storage device, wherein the at least one storage device stores, and the at least one processing circuit is configured to execute instructions of:
    transmitting a configuration to a communication device;
    communicating with the communication device according to the configuration;
    receiving a first message requesting changing the configuration, from the communication device;
    transmitting a Handover Request message to initiate a handover to a second BS, wherein the Handover Request message comprises information indicating that the communication device requests changing the configuration to the second BS when initiating the handover;
    receiving a Handover Request Acknowledge message for responding to the Handover Request message from the second BS, wherein the Handover Request Acknowledge message comprises a handover command; and
    transmitting the handover command to the communication device.

8. The first BS of claim 7, wherein the information is the first message.

9. The first BS of claim 7, wherein the configuration is a carrier aggregation (CA) configuration.

10. The first BS of claim 7, wherein the configuration is a multi-input-multi-output (MIMO) configuration.

11. The first BS of claim 7, wherein the handover command configures the communication device to release or modify the configuration.

* * * * *